United States Patent
Fishman et al.

(10) Patent No.: US 9,929,778 B2
(45) Date of Patent: Mar. 27, 2018

(54) SYSTEMS FOR ENABLING CHASSIS-COUPLED MODULAR MOBILE ELECTRONIC DEVICES

(71) Applicant: Google Inc., Mountain View, CA (US)

(72) Inventors: David Fishman, Mountain View, CA (US); Seth Newburg, Mountain View, CA (US); Ara Knaian, Mountain View, CA (US); Marisa Bober, Mountain View, CA (US); Paul Eremenko, Mountain View, CA (US)

(73) Assignee: Google LLC, Mountain View, CA (US)

( * ) Notice: Subject to any disclaimer, the term of this patent is extended or adjusted under 35 U.S.C. 154(b) by 348 days.

(21) Appl. No.: 14/679,351

(22) Filed: Apr. 6, 2015

(65) Prior Publication Data

US 2015/0288801 A1    Oct. 8, 2015

Related U.S. Application Data

(60) Provisional application No. 62/040,860, filed on Aug. 22, 2014, provisional application No. 61/976,215, filed on Apr. 7, 2014, provisional application No. 61/976,195, filed on Apr. 7, 2014.

(51) Int. Cl.
| | |
|---|---|
| *H04B 1/38* | (2015.01) |
| *H04B 5/00* | (2006.01) |
| *H04W 4/00* | (2018.01) |
| *G06F 1/20* | (2006.01) |

(Continued)

(52) U.S. Cl.
CPC ............ *H04B 5/0037* (2013.01); *G06F 1/203* (2013.01); *H04M 1/0254* (2013.01); *H04M 1/72575* (2013.01); *H04W 4/008* (2013.01); *H04B 5/0012* (2013.01); *H04B 5/0075* (2013.01)

(58) Field of Classification Search
CPC . H04B 1/08; H04B 1/088; H04B 1/03; H04B 3/34; H04B 1/3833; H04M 1/0249; H04M 1/0274; H04M 1/0214; H04M 1/0237; H04M 1/0247; H04M 1/23; H04M 1/0202; G06F 1/181; G06F 1/1613; H05K 5/0217; H01M 2/10
USPC ......... 455/575.1, 347, 348, 349; 379/433.05, 379/433.01, 429, 428.01, 438, 440, 442
See application file for complete search history.

(56) References Cited

U.S. PATENT DOCUMENTS

| | | |
|---|---|---|
| 4,658,333 A | 4/1987 | Grimes |
| 4,856,088 A | 8/1989 | Oliwa et al. |
| 4,904,549 A | 2/1990 | Goodwin et al. |

(Continued)

FOREIGN PATENT DOCUMENTS

| | | |
|---|---|---|
| WO | WO2013120723 | 8/2013 |

OTHER PUBLICATIONS https://youtu.be/oDAw7vW7H0c.

*Primary Examiner* — Anthony Addy
*Assistant Examiner* — Matthew Genack
(74) *Attorney, Agent, or Firm* — Dority & Manning, P.A.

(57) ABSTRACT

A system for enabling a chassis-coupled modular mobile electronic device includes a thermally conductive chassis, a set of module couplers that couple modules of the modular mobile electronic device to the chassis (both thermally and mechanically), a module communication network configured to enable data transfer between the modules, and a module power network configured to enable power transfer between the modules when the modules are coupled to the chassis.

13 Claims, 22 Drawing Sheets

(51) Int. Cl.
*H04M 1/725* (2006.01)
*H04M 1/02* (2006.01)

(56) References Cited

U.S. PATENT DOCUMENTS

| | | | |
|---|---|---|---|
| 4,974,317 A | 12/1990 | Noe et al. | |
| 5,508,720 A | 4/1996 | DiSanto et al. | |
| 5,598,487 A | 1/1997 | Hacket et al. | |
| 5,895,230 A | 4/1999 | Bartley | |
| 5,918,189 A | 6/1999 | Kivela | |
| 5,983,303 A | 11/1999 | Sheafor et al. | |
| 6,219,732 B1 | 4/2001 | Henrie et al. | |
| 6,640,113 B1 | 10/2003 | Shim et al. | |
| 6,697,251 B1 | 2/2004 | Aisenberg | |
| 6,862,173 B1 | 3/2005 | Konshak et al. | |
| 7,068,499 B2 | 6/2006 | Aisenberg | |
| 7,239,509 B1 | 7/2007 | Roeske | |
| 7,436,655 B2 | 10/2008 | Homer et al. | |
| 7,458,815 B2 | 12/2008 | Fallah-Adl et al. | |
| 7,509,094 B2 | 3/2009 | Moran et al. | |
| 7,618,260 B2 | 11/2009 | Daniel et al. | |
| 7,882,382 B2 | 2/2011 | Aksamit et al. | |
| 7,951,007 B2 | 5/2011 | Wolinsky | |
| 7,953,455 B2 | 5/2011 | Moran et al. | |
| 8,149,224 B1 | 4/2012 | Kuo et al. | |
| 8,154,244 B1 | 4/2012 | Gorham et al. | |
| 8,180,395 B2 | 5/2012 | Moran et al. | |
| 8,226,442 B2 | 7/2012 | Uusimaki et al. | |
| 8,244,296 B2 * | 8/2012 | Dorsey | H04B 1/036 370/311 |
| 8,249,656 B2 | 8/2012 | Sherman et al. | |
| 8,285,342 B2 | 10/2012 | Moran et al. | |
| 8,340,795 B2 | 12/2012 | Sherman | |
| 8,391,921 B2 | 3/2013 | Moran et al. | |
| 8,493,282 B2 | 7/2013 | Moran | |
| 8,509,848 B1 | 8/2013 | Cole | |
| 8,842,429 B2 | 9/2014 | Ahn et al. | |
| 8,868,075 B2 | 10/2014 | Sherman et al. | |
| 8,892,164 B2 | 11/2014 | Sherman | |
| 8,924,609 B2 | 12/2014 | Fowler | |
| 2002/0170747 A1 * | 11/2002 | Chu | H05K 1/0201 174/256 |
| 2003/0118006 A1 | 6/2003 | Yang et al. | |
| 2004/0212941 A1 | 10/2004 | Haas et al. | |
| 2005/0190059 A1 * | 9/2005 | Wehrenberg | G08B 13/1409 340/571 |
| 2005/0190124 A1 | 9/2005 | Manabe | |
| 2006/0143352 A1 | 6/2006 | Park | |
| 2006/0273174 A1 | 12/2006 | Laitinen et al. | |
| 2007/0099593 A1 | 5/2007 | Thorne et al. | |
| 2008/0028237 A1 | 1/2008 | Knight | |
| 2008/0064239 A1 * | 3/2008 | Li | H01R 13/635 439/152 |
| 2008/0168282 A1 | 7/2008 | Brundridge | |
| 2008/0197825 A1 | 8/2008 | Siri | |
| 2008/0224769 A1 | 9/2008 | Markowski et al. | |
| 2009/0124288 A1 | 5/2009 | Song et al. | |
| 2009/0128504 A1 | 5/2009 | Smith | |
| 2009/0167245 A1 | 7/2009 | Nguyen | |
| 2009/0280865 A1 | 11/2009 | Danis et al. | |
| 2010/0073202 A1 | 3/2010 | Mazed | |
| 2010/0220432 A1 | 9/2010 | Wise et al. | |
| 2010/0302028 A1 | 12/2010 | Desai et al. | |
| 2010/0323238 A1 | 12/2010 | Takahashi et al. | |
| 2011/0157815 A1 | 6/2011 | Lin | |
| 2011/0179405 A1 | 7/2011 | Dicks et al. | |
| 2011/0264944 A1 | 10/2011 | Newman | |
| 2012/0050000 A1 * | 3/2012 | Melvin, Jr. | G05B 23/0289 340/3.1 |
| 2012/0293934 A1 | 11/2012 | Boduch et al. | |
| 2013/0008707 A1 | 1/2013 | Kim | |
| 2013/0016040 A1 | 1/2013 | Ahn et al. | |
| 2013/0026572 A1 | 1/2013 | Kawa et al. | |
| 2013/0103212 A1 | 4/2013 | Andiappan | |
| 2013/0119919 A1 * | 5/2013 | Bai | H01L 35/325 320/101 |
| 2013/0155600 A1 | 6/2013 | Ross et al. | |
| 2014/0009980 A1 | 1/2014 | Divan et al. | |
| 2014/0025224 A1 | 1/2014 | Wong et al. | |
| 2014/0028635 A1 | 1/2014 | Krah | |
| 2014/0355206 A1 * | 12/2014 | Sullivan | G06F 1/20 361/679.54 |
| 2015/0033167 A1 | 1/2015 | Helmes et al. | |
| 2015/0155614 A1 * | 6/2015 | Youn | H04M 1/0249 343/702 |
| 2015/0245536 A1 * | 8/2015 | Li | F04B 45/04 361/697 |
| 2015/0288053 A1 * | 10/2015 | Saxe | H01Q 1/243 343/702 |

* cited by examiner

*1x2 module may also have two interfaces

SYSTEMS FOR ENABLING CHASSIS-COUPLED MODULAR MOBILE ELECTRONIC DEVICES

CROSS-REFERENCE TO RELATED APPLICATIONS

This application claims the benefit of U.S. Provisional Application No. 61/976,195, filed on 7 Apr. 2014, of U.S. Provisional Application No. 61/976,215, filed on 7 Apr. 2014, and of U.S. Provisional Application No. 62/040,860, filed on 22 Aug. 2014, all of which are incorporated in their entireties by this reference.

TECHNICAL FIELD

This invention relates generally to the mobile electronics field, and more specifically to new and useful systems for enabling chassis-coupled modular mobile electronic devices in the mobile electronics field.

BACKGROUND

Current methods of mobile electronic device design create devices that are static, both in terms of functionality and in terms of design. Companies try to solve this problem by producing a wide range of devices having different functionalities and different designs. As a result, users of such devices are forced to make compromises; they lack the ability to customize the functionality and design of their mobile devices to truly meet their needs and preferences. Thus, there is a need in mobile electronics field to create systems for enabling chassis-coupled modular mobile electronic devices. This invention provides such new and useful systems.

DESCRIPTION OF THE INVENTION EMBODIMENTS

The following description of the invention embodiments of the invention is not intended to limit the invention to these invention embodiments, but rather to enable any person skilled in the art to make and use this invention.

Figure 1:
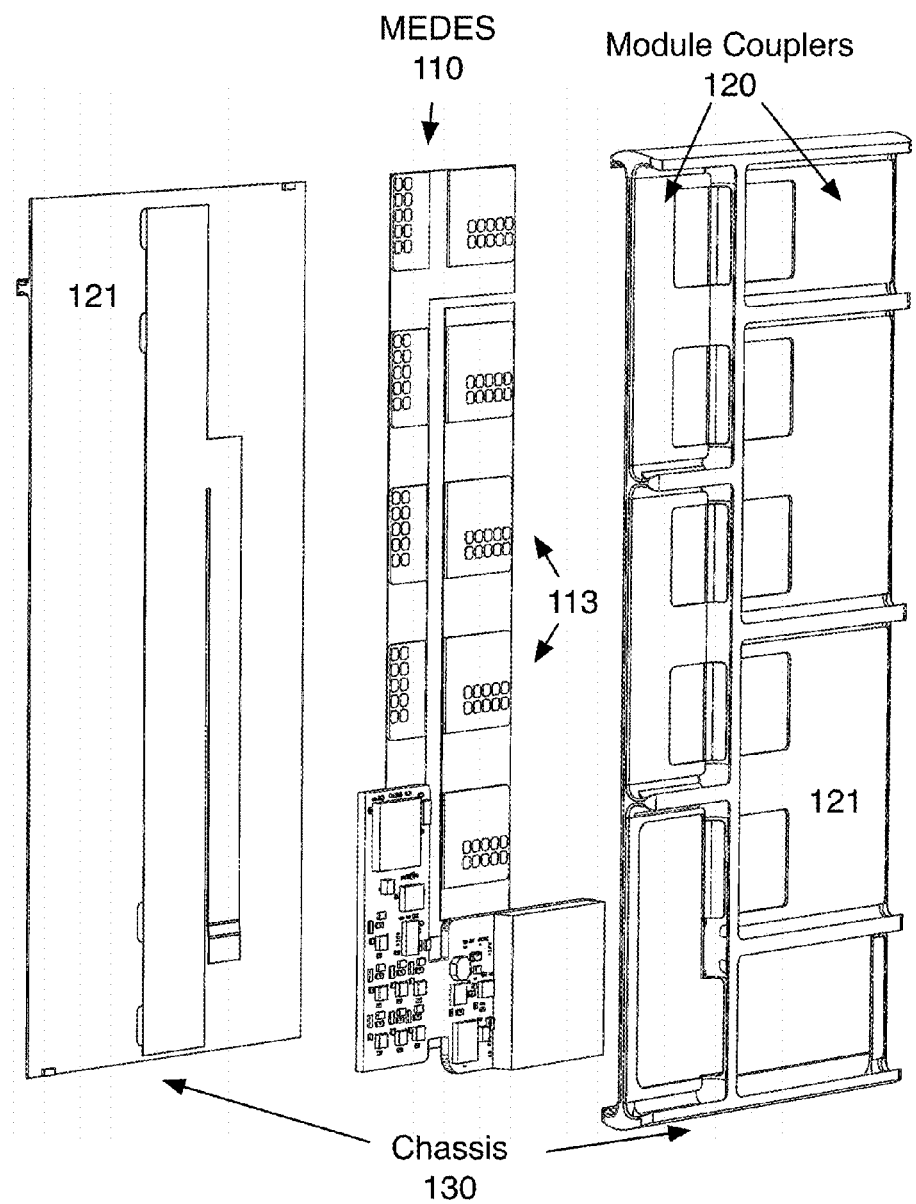
FIG. 1 is an exploded model view of a system of an invention embodiment.
Figure 2:
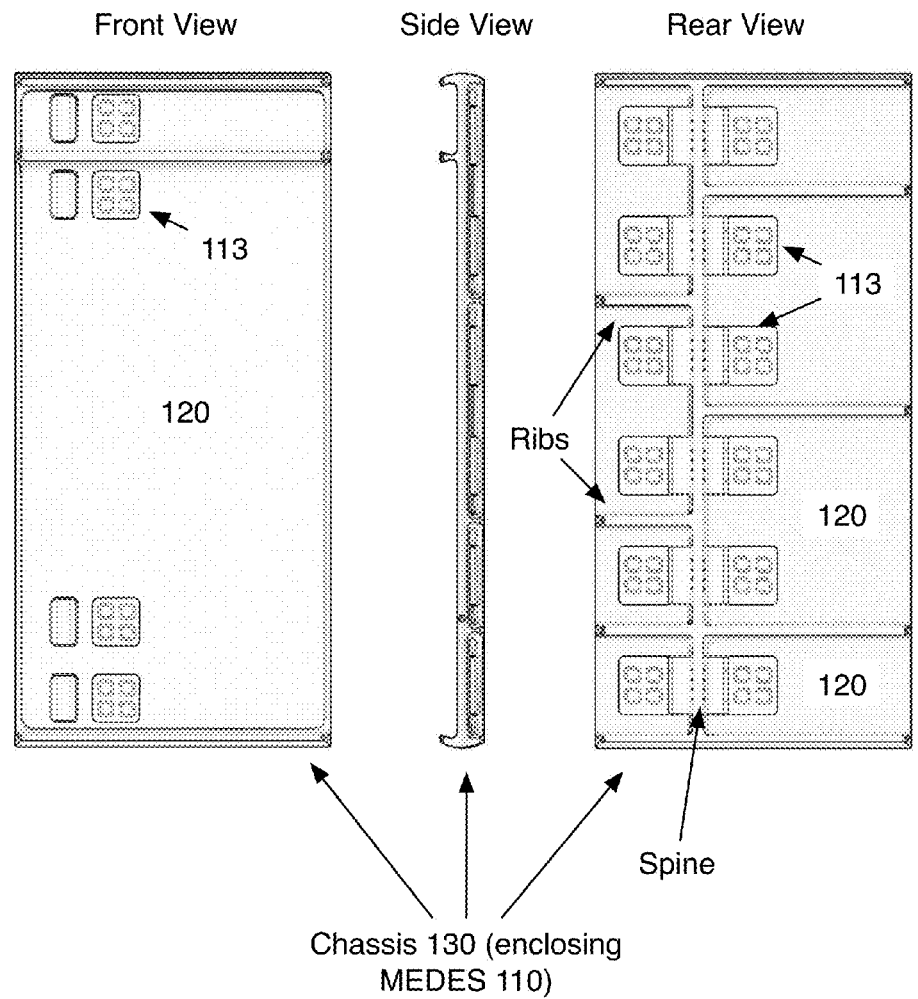
FIG. 2 is a model view of a system of an invention embodiment.

As shown in FIG. 1 and FIG. 2, a system 100 for enabling chassis-coupled modular mobile electronic devices includes a modular electronic device enablement system 110, a plurality of module couplers 120, and a chassis 130.

The system 100 functions to enable the creation or modification of chassis-coupled modular mobile electronic devices through the use of user-removable modules. Modules are preferably coupled to the system 100 via the module couplers 120 and are preferably connected to each other via the modular electronic device enablement system 110 (hereafter referred to as the MEDES 110). The chassis 130 provides structure to the system 100 and is preferably mechanically coupled to both the module couplers 120 and the MEDES 110. After connecting to the system 100 modules preferably are able to communicate with each other and/or send power to each other using the MEDES 110. When multiple modules are connected to the system 100, the system 100 preferably enables the modules in confederation to serve as a mobile electronic device. The mobile electronic device created by such a confederation is preferably characterized by the confederated modules as well as the parameters of confederation, which are preferably determined by the system 100 and the confederated modules.

Figure 3A:
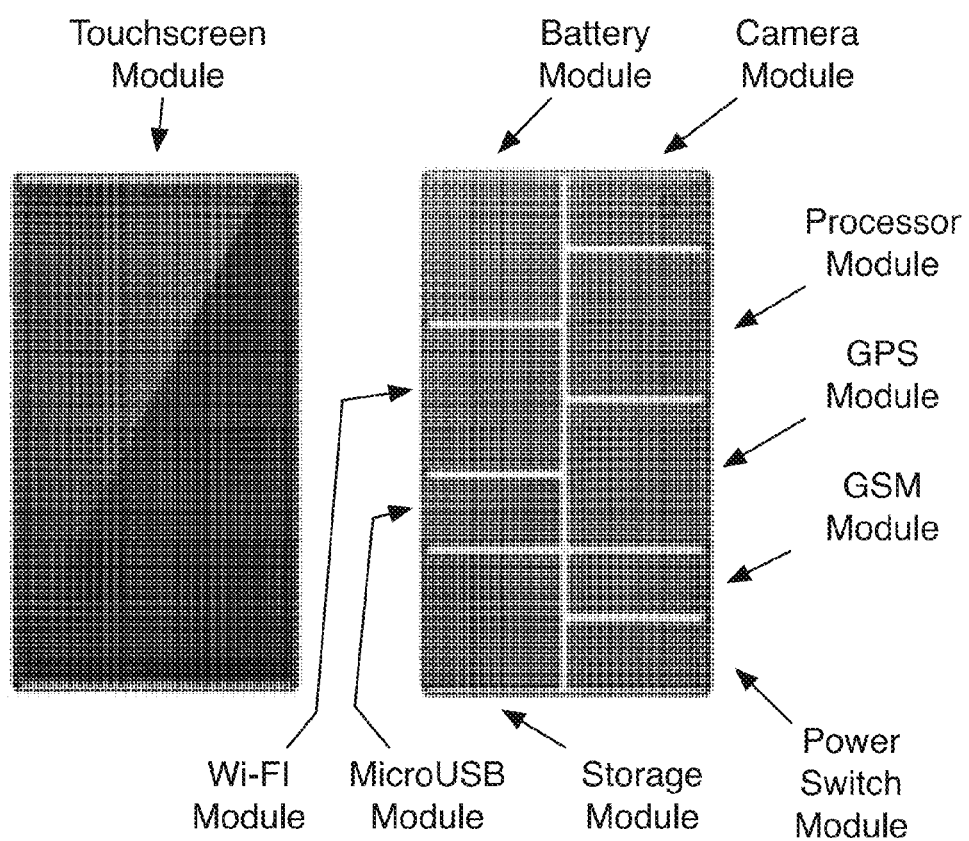
FIGS. 3A and 3B are image views of example mobile electronic devices based on a system of an invention embodiment.
Figure 3B:
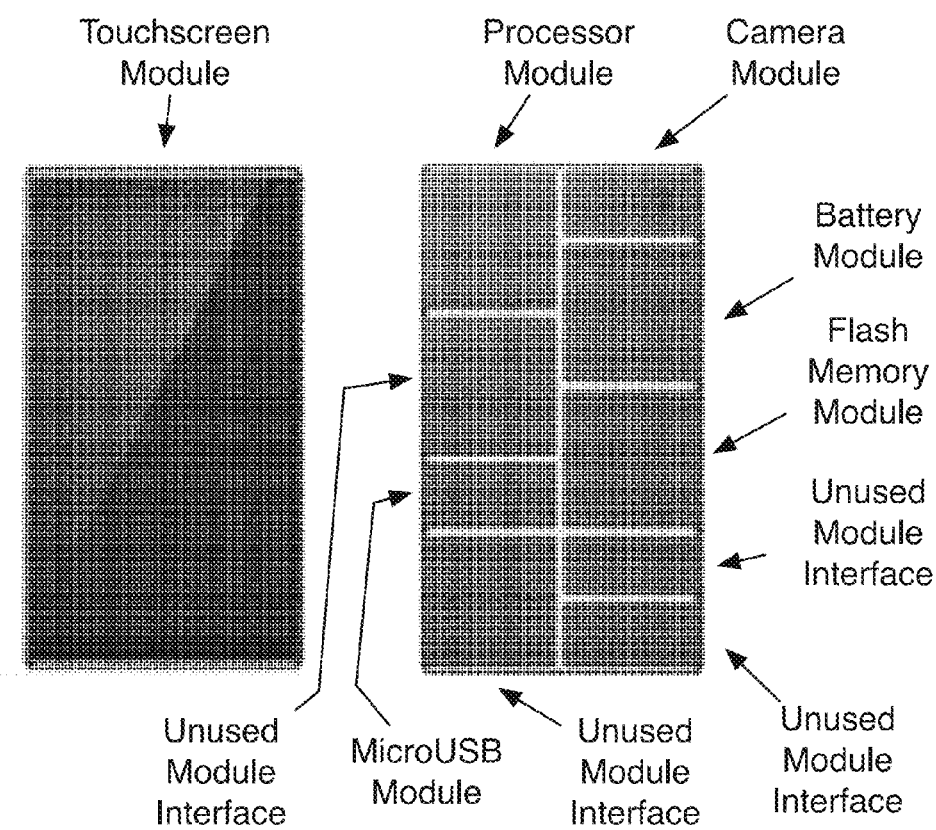

As shown in FIG. 3A, a chassis-coupled modular mobile electronic device configured to serve as a smartphone is an example of a possible mobile electronic device enabled by the system 100. As shown in FIG. 3B, a chassis-coupled modular mobile electronic device configured to serve as a camera is an example of a possible mobile electronic device enabled by the system 100. Other examples of possible mobile electronic devices include those configured to serve as tablets, laptops, media players, cameras, measurement devices, gaming systems, vehicular computing devices, set-top boxes, and televisions.

Modules connected by the system 100 are preferably user-removable and replaceable, enabling users to create mobile electronic devices with highly varied form and functionality. For example, a user may connect a camera module, a flash memory module, a processor module, a battery module, and a touchscreen LCD module to the system 100 to create a small and lightweight camera as shown in FIG. 3B. The user could later add a cell-phone radio module and a microphone/speaker module to create a camera phone. Modules preferably follow an open standard, enabling third party developers and entities to develop modules.

Figure 4:
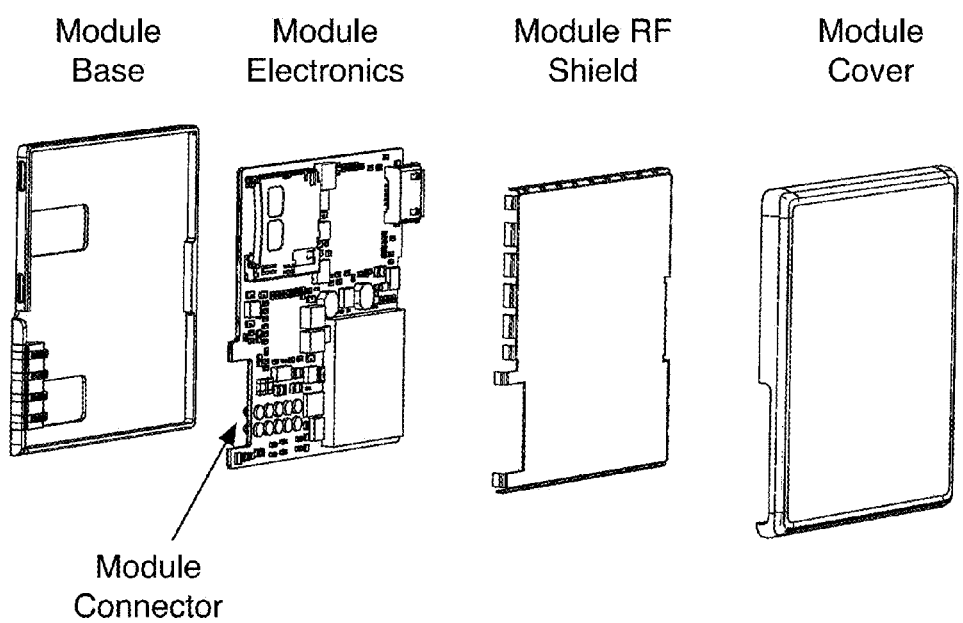
FIG. 4 is an exploded model view of an example module.

As shown in FIG. 4, an example module includes a module base, module electronics, a module radio-frequency (RF) shield, and a module cover. The module base of the example module provides structure and heat transfer for the module. The module electronics of the example module provide the main functionality of the module and enable connection to the system 100 through the module connector. The module RF shield of the example module prevents external RF transmission from affecting the module. The module cover of the example module seals the module (and protects the module electronics). The module cover of the example module is user-replaceable, allowing for customization of the appearance and/or functionality of the module.

The flexibility afforded by module confederation may enable a number of potentially favorable outcomes. Users can purchase only the modules necessary for their needs, allowing for reductions in cost. Users can also choose to replace modules or add additional modules at a later time. In combination, these two outcomes may help increase accessibility to mobile electronic devices (and in many cases, the internet) throughout the world, especially for people for whom a smartphone or a PC is not currently a good value proposition. These two outcomes also help slow the creation of electronic waste by allowing mobile electronic devices to be upgraded or modified rather than replaced. Further, because the system 100 is compatible with modules of highly varied form and function, and because modules are preferably based on an open standard, module confederation allows small or specialized companies to make modules playing to their strengths without designing a full mobile electronic device.

The system 100 is preferably compatible with a large range of module types. Modules preferably may serve any function or purpose as long as they are capable of connecting to and communicating through the system 100. Some example module types include sensor modules, processor modules, storage modules, communication modules, display modules, and power modules Examples of sensor modules include accelerometer modules, GPS modules, camera modules, depth imaging modules, fingerprint reader modules, biometric modules, microphone modules, digital/analog input modules, haptic input modules, infrared flash modules, pedometer modules, barometer modules, magnetometer modules, and gyroscope modules. Examples of processor modules include application processor modules and graphics processor modules. Examples of storage modules include flash memory modules and RAM modules. Examples of communication modules include Wi-Fi radio modules, GSM/CDMA radio modules, HDMI connector modules, NFC modules, Bluetooth radio modules, and USB connector modules. Examples of display modules include touchscreen LCD modules and e-ink display modules. Examples of power modules include battery modules, solar panel modules, and battery charging modules. Note that these example module types are in no way exhaustive or exclusive; i.e., modules may incorporate functionality from many of these example types or from none at all, and modules may additionally or alternatively incorporate functionality not herein described.

Figure 5:
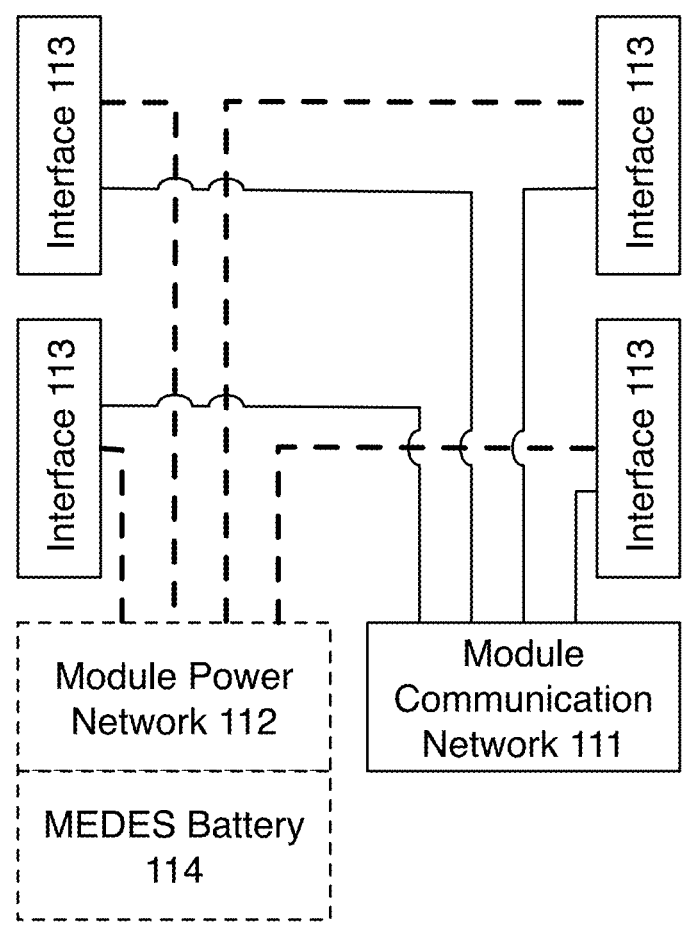
FIG. 5 is a diagram view of a modular electronic device enablement system of a system of an invention embodiment.

As shown in FIG. 5, the modular electronic device enablement system (MEDES) 110 functions to enable modules in confederation to serve as a modular electronic device. The MEDES 110 is preferably substantially similar to the system of U.S. patent application Ser. No. 14/462,849, which is incorporated in its entirety by this reference, but may additionally or alternatively be any suitable system.

The MEDES 110 preferably includes a module communication network 111, but may additionally or alternatively include a module power network 112 and a plurality of module interfaces 113. Modules are preferably connected to the MEDES 110 through the module interfaces 113 but may additionally or alternatively be connected to the MEDES 110 in any suitable manner.

The module communication network 111 functions to allow for data communication between the modules connected to the MEDES 110. Data transfer over the module communication network 111 is preferably high speed, low power, reliable, and robust. The module communication network 111 preferably allows for data communication whenever modules are communicatively coupled to the MEDES 110 (that is, they are coupled in such a way that modules may communicate with the module communication network-over wired connections, wirelessly, or otherwise). The module communication network 111 preferably enables direct communication between any two modules connected to the MEDES 110, but may additionally or alternatively enable indirect communication between modules connected to the MEDES 110 (e.g. enabling one module to communicate with another module through an intermediary module). The module communication network 111 preferably enables direct communication between modules by connecting each module to a module communication network switch, but may additionally or alternatively enable direct communication between modules using any alternative connection architecture (e.g., connecting modules to a data bus).

Direct communication preferably refers to data transfer that does not require a host or intermediary module for communication. For example, in the case of a an module communication network 111 utilizing a switch, modules are preferably able to communicate directly by sending packets to the switch, which then are sent directly to other modules based on the destination address (set by the originating module). This is distinct from an architecture that requires a host; for example, peripheral devices connected to a USB bus require a master device to be able to pass information between each other. Another consequence of this is the maximum bandwidth available for inter-device communication may be inherently limited by the bandwidth of connections to the master device and the processing capability of the master device.

The module communication network 111 preferably connects to the module interfaces 113 electrically via conductive wires, but may additionally or alternatively connect to the module interfaces 113 via any suitable connection method. In one example, the module communication network 111 connects to the module interfaces 113 using optical connections. In this example, the module communication network 111 might include light emitters and detectors for each module interface 113; the light might be passed through fiber optics, through an optical backplane, or through another type of waveguide or optical circuit component.

The module power network 112 functions to distribute power to modules connected to the MEDES 110. The module power network 112 preferably enables any module connected to the MEDES 110 to send power to or receive power from any other module connected to the MEDES 110. The module power network 112 preferably enables power transfer between modules by connecting each module interface 113 to a common power bus of the module power network 112, but may additionally or alternatively enable direct power transfer between modules using any alternative connection architecture (e.g., a switched power architecture). The module power network 112 in particular preferably supports three types of modules (note that some modules may be more than one type): power consuming modules (e.g. camera, display), power producing modules (e.g. charger, solar panel), and power storing modules (e.g., batteries, capacitors). The module power network 112 preferably supports hot-swapping modules, including battery modules. The module power network 112 preferably connects to the module interfaces 113 via conductive wires but may additionally or alternatively connect to the module interfaces 113 electrically via any suitable connection method.

Figure 6:
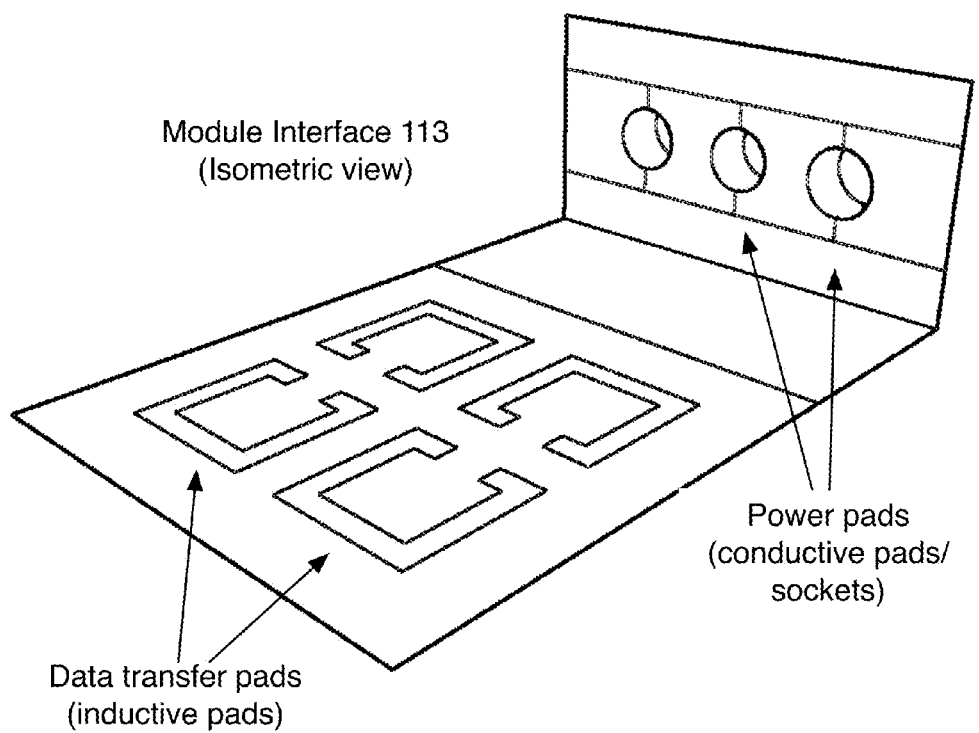
FIG. 6 is a perspective view of a module interface of a modular electronic device enablement system of a system of an invention embodiment.

The module interfaces 113 function to enable the connection of modules to the MEDES 110. The module interfaces 113 preferably allow for modules to connect to both the module communication network 111 and the module power network 112; the module interfaces 130 are preferably connected to the module communication network 111 and the module power network 112 with conductive wires, but may additionally or alternatively be connected to the module communication network 111 and the module power network 112 in any suitable manner as previously described. The module interfaces 113 may connect modules to the module communication network 111 and the module power network 112 in any suitable manner (e.g. electrically, optically); the manner of connection to the module communication network 111 and the manner of connection to the module power network 112 for a given module may be of the same types or of different types. For example, modules may connect to the module interface 113 using contact methods (e.g. conductive contact via plug and socket) and/or non-contact methods (e.g. optical, capacitive, inductive, and RF data/power transfer methods). As shown in FIG. 6, a module may (through the module interface 113) connect to the module communication network 111 using non-contact inductive data transfer methods and to the module power network 112 using conductive contact via a spring pin to conductive pad interface.

The module interfaces 113 are preferably identical, allowing any compatible modules to connect to any module interface 113 of the MEDES 110, but may alternatively be non-identical (e.g. separate interface types for different module types).

The module interfaces 113 are preferably integrated into or otherwise connected to the module couplers 120, but may additionally or alternatively be separate of the module couplers 120.

Figure 7:
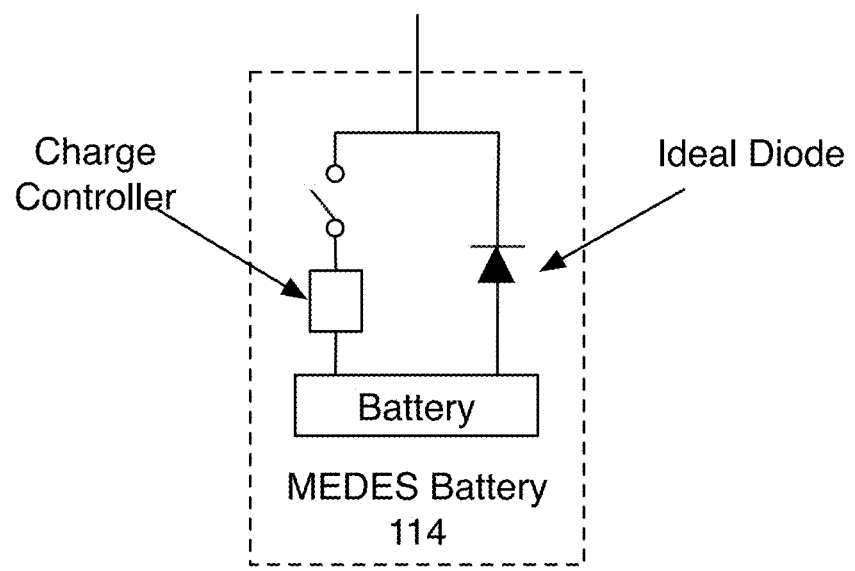
FIG. 7 is a diagram view of a battery of a modular electronic device enablement system of a system of an invention embodiment.

The MEDES 110 may additionally include a MEDES battery 114. The MEDES battery 114 functions to make sure that the MEDES 110 has power even when no power source module is connected (enabling, for instance, the hot-swap of battery modules). The MEDES battery 114 may additionally provide power to other modules (e.g. while a battery module is being hot-swapped for another). The MEDES battery 114 may additionally provide power to other modules (e.g. while a battery module is being hot-swapped for another). The MEDES battery 114 may be any type of power storage device (e.g., Li-Ion battery, supercapacitor, compressed fluid storage). As shown in FIG. 7, the MEDES battery 114 preferably includes a charging circuit that includes a charge controller, a charging switch, and an ideal diode controller. This charging circuit preferably prevents current from flowing into the battery of the MEDES 110 when the battery is not being charged (via the ideal diode controller), and also manages the rate and method of charging when the battery is being charged (via the charge controller).

The MEDES 110 is preferably managed by controllers within the MEDES 110, but may additionally or alternatively be managed by the modules themselves or any other suitable management mechanism. Managing the MEDES 110 preferably includes monitoring and/or controlling data and power over the module communication network 111 and the module power network 112.

The MEDES 110 may additionally manage modules, either as they relate to module communication network 111 and module power network 112 operation or for any other reason. For instance, the MEDES 110 may connect to thermal sensors integrated into the chassis 130, and in this way, detect thermal properties of modules connected to the system 100. The MEDES 110 may be able to instruct a module to reduce power consumption if the module begins to overheat, for instance, and if the module does not respond, the supervisory controller may cut off power via the module power network 112 to the module to protect the module and/or the system 100 from damage. The MEDES 110 may also perform functions such as instructing one module to go to a sleep mode based on signals from other modules; for example, putting a display module to sleep after detecting a period of inactivity from a motion-detecting module.

The module couplers 120 function to couple modules to the system 100. The module couplers 120 may couple modules to the system 100 mechanically, thermally, electrically, magnetically, and/or optically. The module couplers 120 are preferably themselves coupled to the chassis 130, and are more preferably removably fixed to the chassis 130, but may additionally or alternatively be integrated into the chassis 130.

Figure 8:
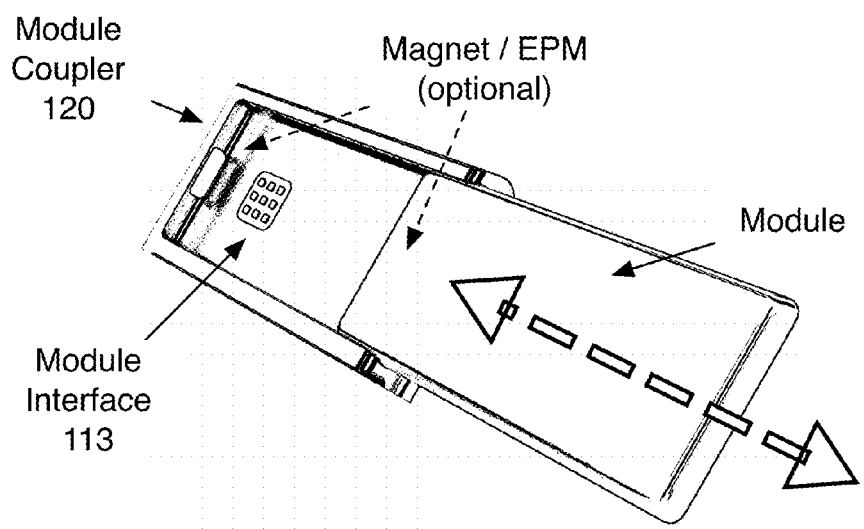
FIG. 8 is a perspective view of a module coupler of a system of an invention embodiment.
Figure 8:
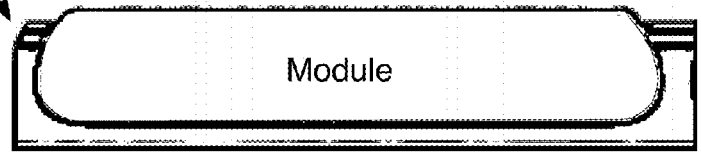
Figure 16:
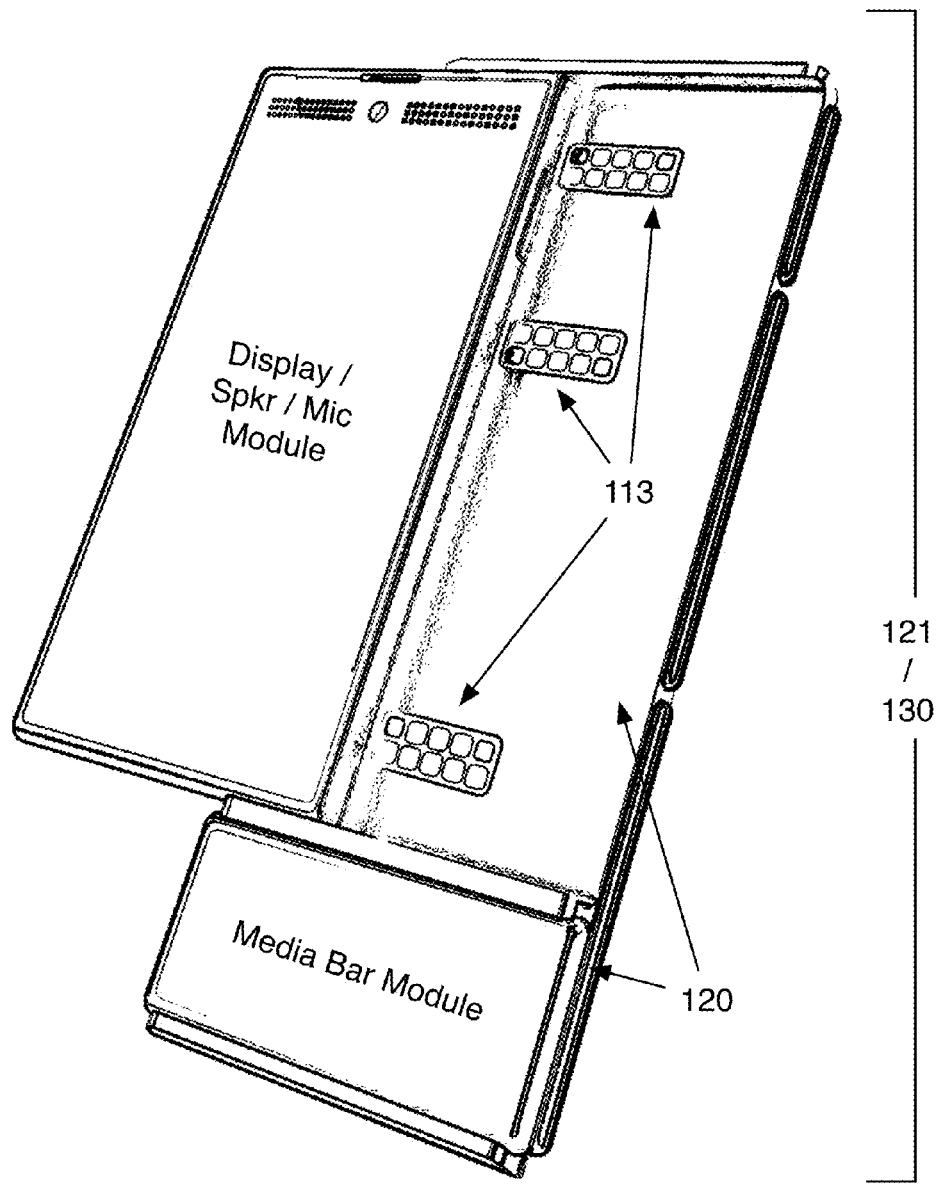
FIG. 16 is a model view of a front module coupler backplane of a system of an invention embodiment.

The module couplers 120 preferably couple modules mechanically to the chassis 130. More specifically, modules preferably mechanically couple to the module couplers 120; the module couplers 120 are themselves coupled to or part of to the chassis 130, enabling module to chassis 130 coupling. The module couplers 120 preferably hold the modules securely, but also allow modules to be removed when desired. The module couplers 120 preferably substantially limit module movement when modules are fully coupled to the module couplers 120 to allow for precise alignment (e.g. to align contact pads) but may additionally or alternatively allow some module movement along some degree of freedom. The module couplers 120 preferably have mechanical guides or other guides to aid in aligning the module during coupling, but may alternatively have no such guides. If the module couplers 120 have mechanical guides, the mechanical guides preferably aid in module retention through friction. The guides are preferably defined by a cavity with a geometric profile that is complementary to at least a portion of the profile of a module as shown in FIG. 8. The cavity additionally includes an open portion that enables insertion of a module from along at least one axis; e.g., axial motion and/or rotational motion of a module into the space defined by the cavity. The open portion preferably restricts insertion to a single axis (i.e., modules may be inserted only along a line, as shown in FIG. 8), but may additionally or alternatively allow insertion in multiple axes). The open portion may further restrict insertion to a single direction (as shown in FIG. 8), or may allow insertion to occur in multiple directions per axis (e.g., the display module as shown in FIG. 16 may be inserted from either the left or the right). The module couplers 120 may have detents; e.g., structures that resist the movement of the modules when they are fully coupled to the module couplers. Example of these structures include spring-loaded balls mounted on a surface of the module that fit into corresponding shallow holes on a complementary surface of the module coupler 120 (or vice versa), or magnets mounted on a surface of a module and a complementary surface on a module coupler 120.

Modules may be coupled to the module couplers 120 by sliding the modules into the module couplers 120, pressing the modules into the module couplers 120, plugging the modules into the module couplers 120, screwing the modules into the module couplers 120, latching the modules into the module couplers 120, or any other suitable method of coupling. In the case where the module couplers 120 couple to modules using non-contact force (e.g. electrostatic or magnetic force), coupling may simply involve placing a module in the correct spot on a module coupler 120. For example, module couplers 120 may include magnets that automatically align modules correctly even they are initially positioned by in an unaligned state.

The modules preferably sit proud of the module couplers 120 on all exposed surfaces of the modules, but may alternatively sit flush or sunken relative to the module couplers 120 on some or all exposed surfaces of the modules.

The module couplers 120 are preferably fabricated from a rigid material, and more preferably are fabricated from metal, but may alternatively be fabricated in whole or in part from any other material, including flexible and non-metallic materials.

As shown in FIG. 8, the module couplers 120 are preferably designed to contact a module of a soft trapezoidal shape on four surfaces (i.e., soft-trapezoidally-shaped modules); three sides of the module and the bottom of the module. The module coupler 120 is preferably coupled to the module when the module is slid fully into the module coupler 120. The module coupler 120 preferably retains the module in least in part via friction on the contact surfaces. The module coupler 120 may additionally also retain the module with a retention mechanism; for example, magnets placed on the far edge of the module coupler 120 and the corresponding edge of an inserted module.

Figure 9:
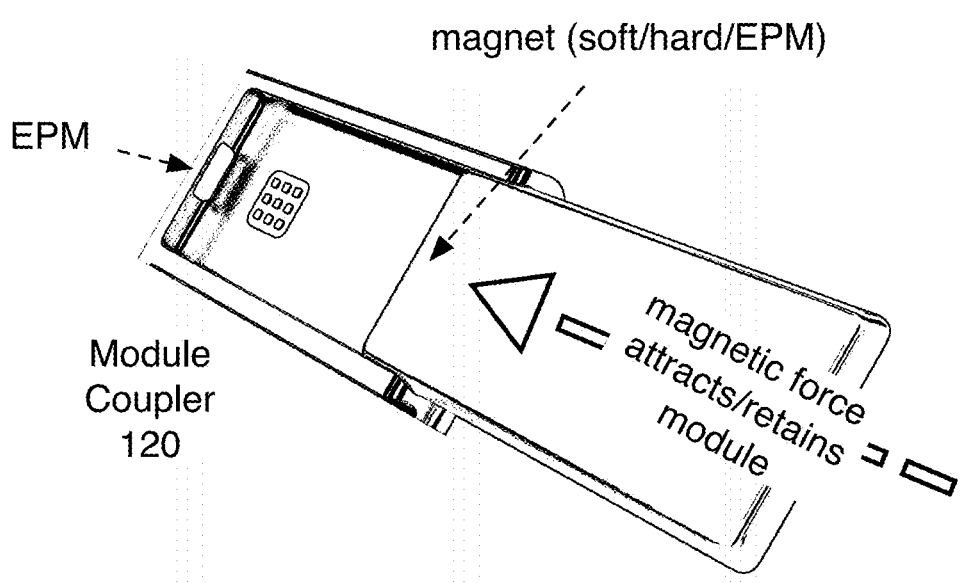
FIG. 9 is a perspective view of a module coupler of a system of an invention embodiment.

In a variation of an invention embodiment, module couplers 120 include electropermanent magnets (EPMs), as shown in FIG. 9. The module and module coupler 120 preferably have complementary interface pads; the module coupler 120 preferably has an electropermanent magnet while the module has a complementary magnetic attachment point (e.g., a ferromagnet). When the module is slid into the module coupler 120, the mechanical rails enable the module to be guided into an attachment position, where the interface pads of the module and the module coupler 120; then, the electropermanent magnet is activated to secure the module in that position. Additionally or alternatively, the module may have an electropermanent magnet while the module coupler 120 has a complementary magnetic attachment point.

If the module coupler 120 includes an EPM, the module coupler 120 preferably also includes EPM circuitry. The EPM interface functions to provide a low power, electronically controllable means to securely attach modules to other modules and/or modular mobile electronic devices. The EPM interface preferably has two selectable states: an attached state and a released state, corresponding to high and low levels of magnetic force. Power is required when switching between the attached state and released state, but power is preferably not required to maintain either state. EPM interfaces preferably provide enough magnetic force (in conjunction with a soft magnet, permanent magnet, or other EPM) in the attached state to prevent modules from being mechanically de-coupled; in the released state, EPMs preferably provide a slight retaining force, allowing modules to be mechanically de-coupled with a small applied force. A soft magnet is preferably formed of soft magnetic material (e.g. annealed iron, the alloy known as Hiperco 50®). Additionally or alternatively, EPMs may provide no retaining force or may provide a repelling force, potentially allowing modules to be mechanically de-coupled without an applied force. If the module coupler 120 includes mechanical rails as previously described (or otherwise accepts module insertion along a single direction), the EPM preferably couples to a magnetic material on a surface perpendicular to the direction of modular insertion. Coupling on a surface perpendicular to the direction of modular insertion preferably reduces the amount of shear force experienced at the interface and therefore increases coupling strength. Additionally or alternatively, the EPM may couple to a magnetic material in any location that aids in module mechanical coupling.

As shown in FIG. 9, the EPM functions to provide, in conjunction with a soft magnet, permanent magnet, or other EPM, a magnetic force. In one implementation, the EPM is constructed of alternating N42SH (sintered neodymium-iron-boron) magnets and AlNiCo (aluminum-nickel-cobalt) magnets surrounded by wire coil, separated by the alloy known as Hiperco 50®. The N42SH magnets are magnetized parallel to the long axis of the EPM 131, with each alternating N42SH magnet magnetized opposite to the previous N42SH magnet. The AlNiCo magnets are preferably magnetized together in one of two states: either in the same direction as the corresponding N42SH magnets (corresponding to the attach state) or in the opposite direction of the corresponding N42SH magnets (corresponding to the release state). Additionally or alternatively, some Alnico magnets are magnetized opposite and some are magnetized in the same direction as the corresponding N42SH magnets, creating a state with magnetic holding force in between that of the attach and release states.

EPM circuitry functions to switch the EPM from one state to another. The EPM circuitry preferably includes a boost circuit to increase supply voltage and a high-value capacitor to store current. The EPM circuitry preferably charges the high value capacitor and then discharges it in a high current pulse across the wire coils of the EPM, enabling an EPM state change. The wire coils may receive current pulses individually or together; further, more than one current pulse per wire coil may be used to enable the EPM state change.

The module coupler 120 may also retain the module using a latching mechanism; for example, a pin that when extended prevents the module from being removed (the pin would be retracted to remove the module), or a snap latch that holds the module tight against the contact surfaces of the module coupler 120 when engaged.

Figure 10:
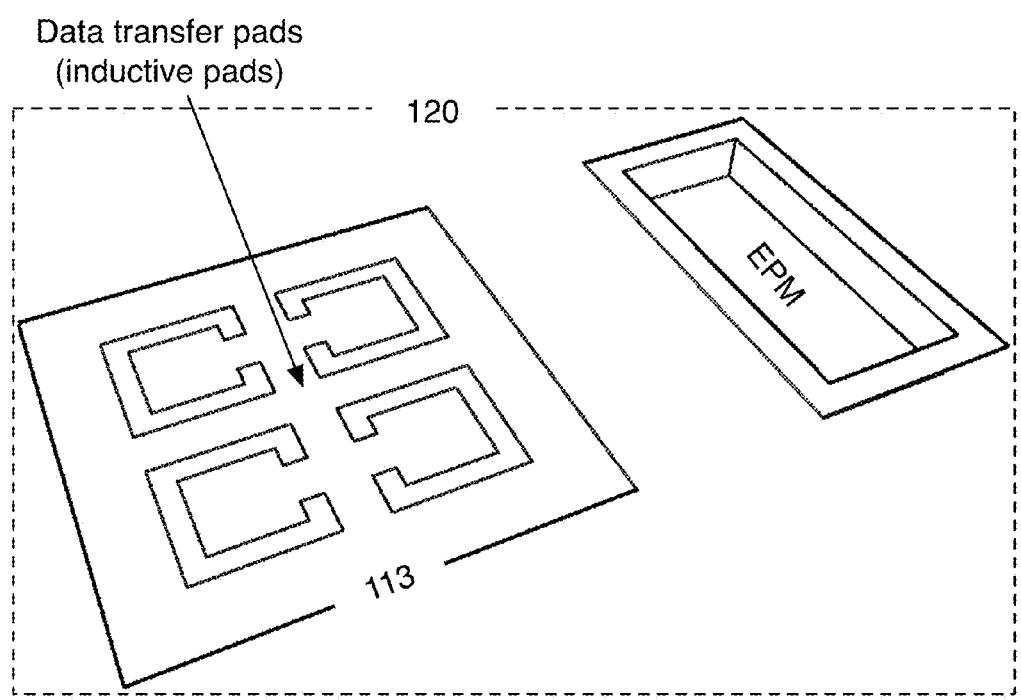
FIG. 10 is a perspective view of a module coupler of a system of an invention embodiment.
Figure 11:
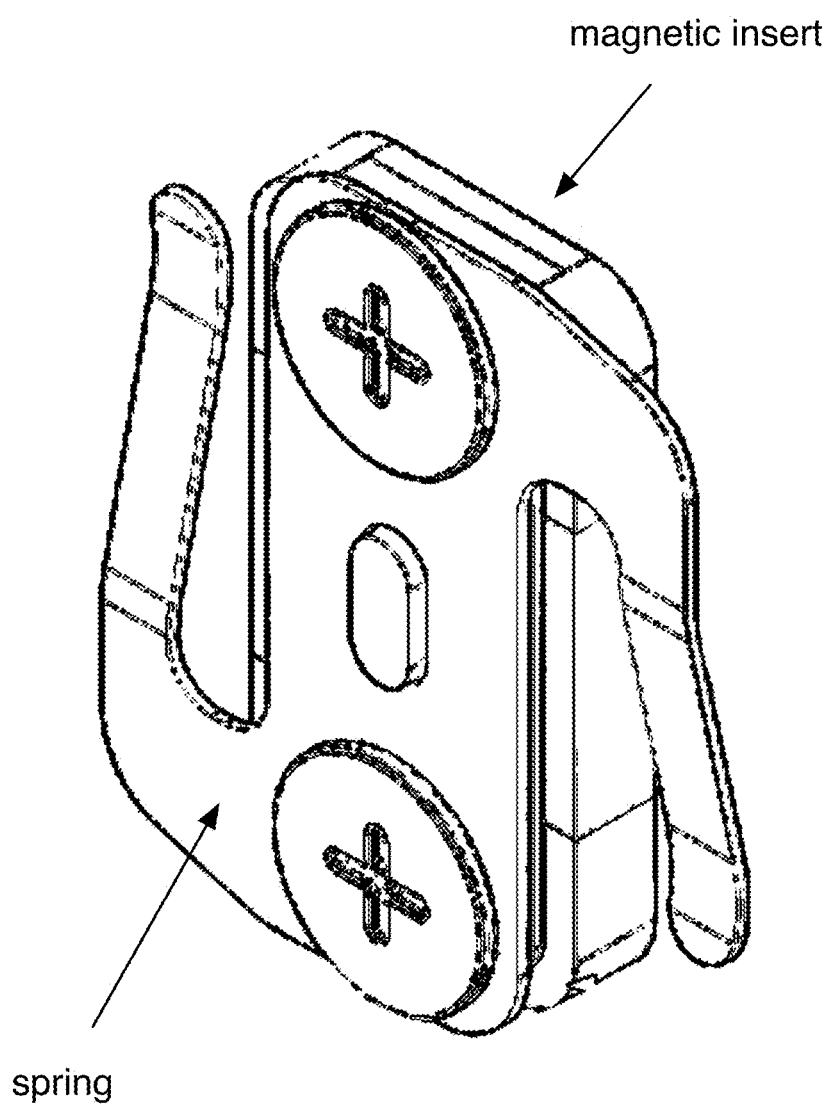
FIG. 11 is a perspective view of a spring-loaded magnetic insert of a module.

In a variation of an invention embodiment, the module coupler 120 includes an EPM sunken into the surface of the module coupler 120, as shown in FIG. 10. The module has a corresponding magnetic insert block that is spring-mounted to the module such that in a default state the spring holds the magnetic insert below the surface of the module (i.e., the magnetic insert does not stick out of the module), as shown in FIG. 11. When the module is positioned over the EPM and the EPM is in an attached state, the magnetic force of the EPM on the magnetic insert pulls the magnetic insert into the EPM depression on the surface of the module coupler 120, preventing the module from moving in a direction perpendicular to the vertical direction (i.e., the direction the magnetic insert moves).

The module couplers 120 preferably couple modules thermally to the chassis 130, but may additionally or alternatively thermally isolate modules from the chassis 130. The module couplers 120 are preferably made of thermally conductive materials, but alternatively may be made of materials of any thermal conductivity. The module couplers 120 are preferably thermally coupled to both the modules and the chassis 130, allowing heat to flow from the modules into the chassis 130 and vice versa. The module couplers 120 may additionally integrate heat transfer features; for instance, the module couplers 120 may include fins to allow heat from modules or the chassis 130 to dissipate in air. As another example, the module couplers 120 may include thermoelectric devices, fluid channels, or other active or passive heat transfer mechanisms.

The module couplers 120 preferably couples modules electrically (e.g. conductively, capacitively, inductively) to the MEDES 110. The module couplers 120 may additionally or alternatively couple modules electrically to the chassis 130 (for instance, grounding the case of a module to the chassis 130). The module couplers 120 preferably couple modules electrically to the MEDES 110 by positioning module interfaces 113 within the module couplers 120 (for instance, by cutting holes for the module interfaces 113 through the module couplers 120), but may additionally or alternatively couple modules electronically to the MEDES 110 in any suitable way. The module couplers 120 preferably assist in the electrical coupling of modules to the module interfaces 113 by physically aligning the electrical connectors of modules to the module interfaces 113 when the modules are fully coupled to the module couplers 120. Each module coupler 120 may include one or more module interfaces 113 (allowing some modules to connect to more than one module interface 113).

The module couplers 120 may additionally or alternatively couple modules optically to the MEDES 110. The module couplers 120 preferably perform optical coupling by aligning optical connectors on modules to optical connectors on module interfaces 113, but may additionally couple modules optically to the MEDES 110 in any suitable way.

The module couplers 120 may additionally or alternatively couple to structures other than modules. For example, a module coupler 120 may mechanically couple to a module blank (i.e. a cover designed to cover and/or fill an unused module coupler 120). As another example, a module coupler 120 may mechanically couple to an attachment structure (e.g. a structure designed to attach the module coupler 120 to another structure). A purely mechanical attachment structure might, for instance, include a bicycle mount that occupies a module slot. Module couplers 120 might additionally or alternatively couple electrically to attachment structures. The same bicycle mount attachment structure might include wires linked to a generator circuit that charges the system 100 through the module coupler 120 when a user pedals the bicycle.

The module couplers 120 are preferably removably fixed to the chassis 130, but may additionally or alternatively be coupled to the chassis 130 in any suitable manner. The module couplers 120 may be attached to the chassis 130 in a manner substantially similar to any of the ways modules might be attached to the module couplers 120 (e.g. by friction, by non-contact force, with screws, etc.).

As shown in FIG. 1, the module couplers 120 are preferably coupled to the chassis in a set in a module coupler backplane 121, but may additionally or alternatively be coupled to the chassis 130 individually or in any other suitable manner. The module coupler backplane 121 is preferably part of the chassis 130 but may alternatively be separate from the chassis 130. In one embodiment, two module coupler backplanes 121 (one for front side modules and another for backside modules) couple to form the chassis 130, sandwiching the MEDES 110 in-between. The module couplers 120 may additionally or alternative be organized into any number of module coupler backplanes 121 arranged into any suitable arrangement.

Figure 12:
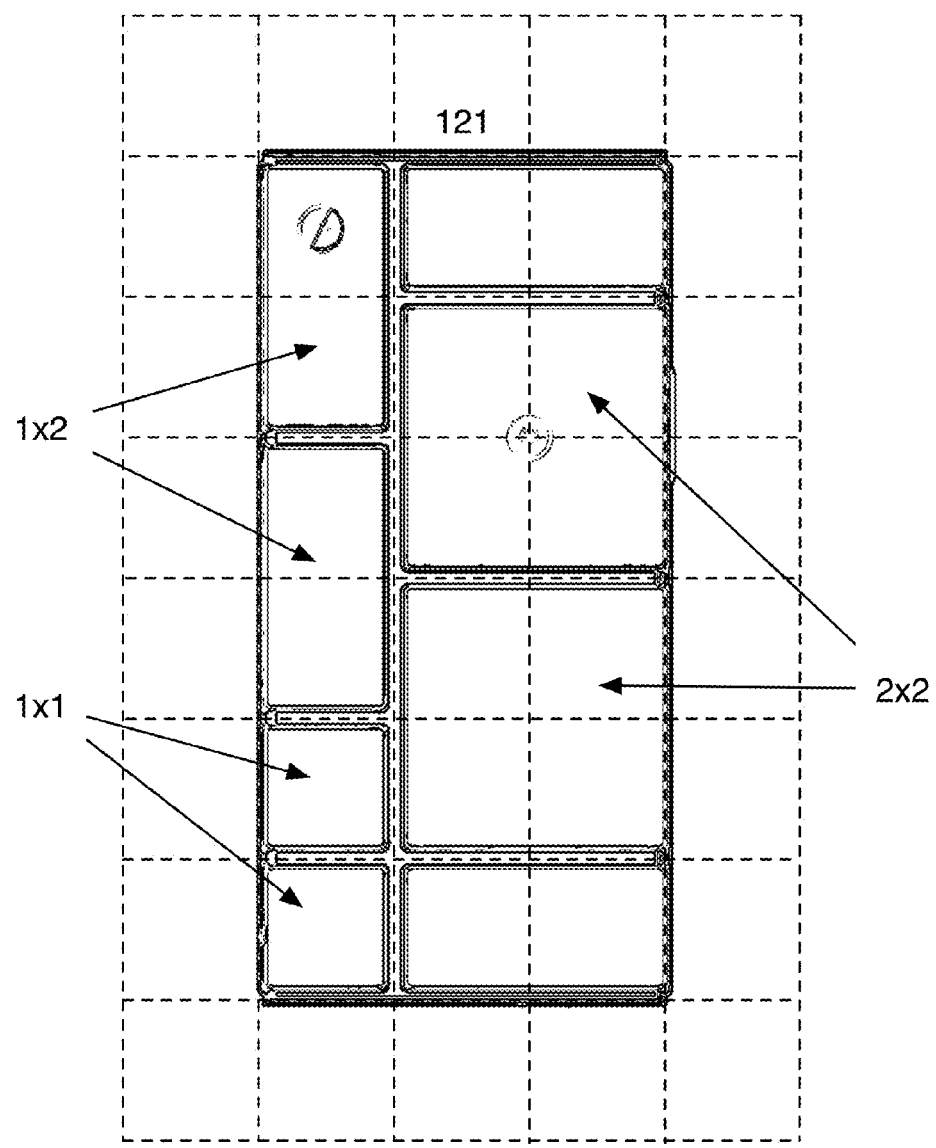
FIG. 12 is a model view of a system of an invention embodiment.
Figure 13:
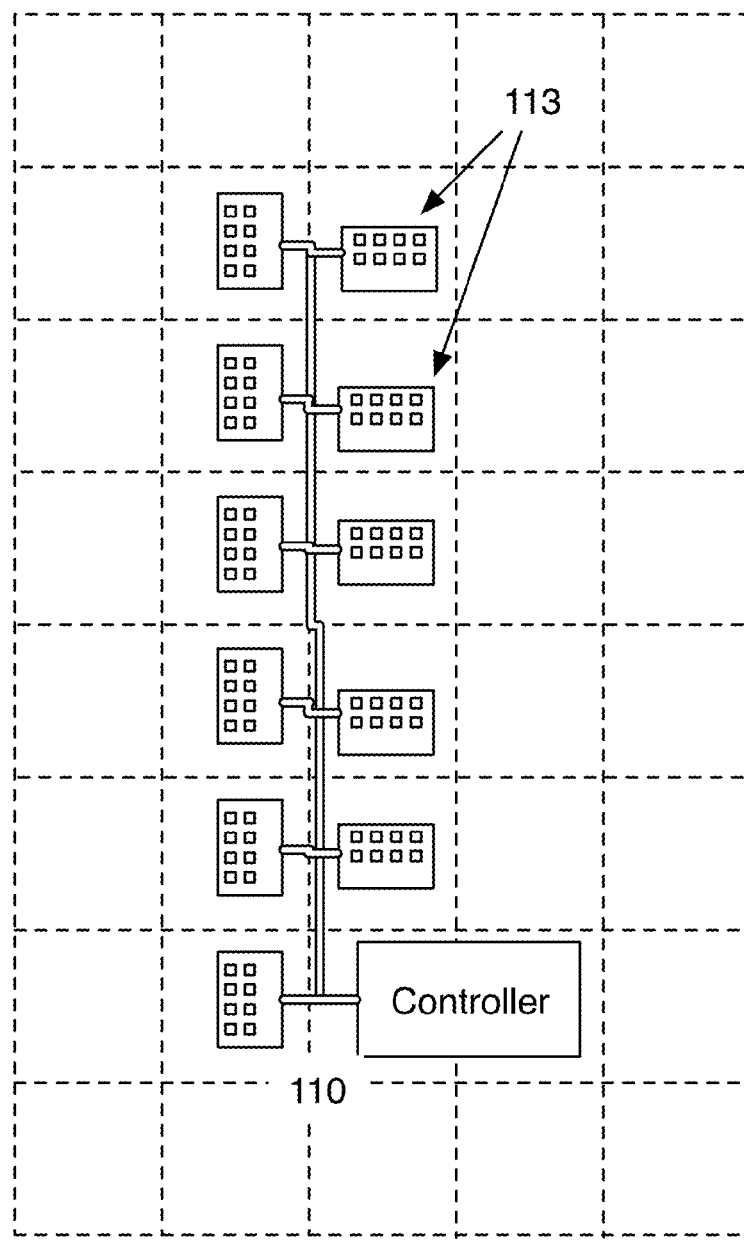
FIG. 13 is a diagram view of module interfaces of a modular electronic device enablement system of a system of an invention embodiment.

As shown in FIG. 12, modules and module couplers 120 are preferably sized according to a grid system. More specifically, module couplers 120 are preferably sized according to a square grid pattern, starting with a unit size of 1×1. Additionally or alternatively, any suitable regular or irregular geometric grid or pattern may be used such as a hexagonal grid. Dimensions of modules and module couplers 120 may then be any positive integer multiple of the unit size (e.g. 1×2, 2×2, 1×3, 2×3, 3×3 . . . ) As shown in FIG. 13, module couplers 120 are preferably designed so that module coupling is rotationally symmetric; that is, a rotated 2×1 module should be able to couple to a 1×2 module coupler 120. Additionally or alternatively, module coupling may not be rotationally symmetric. Further, if there are multiple module interfaces 113 per module coupler 120, multiple modules may be able to connect per module coupler 120 (also as shown in FIG. 13). The multiple modules may additionally or alternatively couple together with an adapter (e.g. a clip-on rib) to allow them to fit securely in the module coupler 120. The module coupler backplane 121 likewise preferably arranges module couplers 120 according to a grid system.

Figure 14:
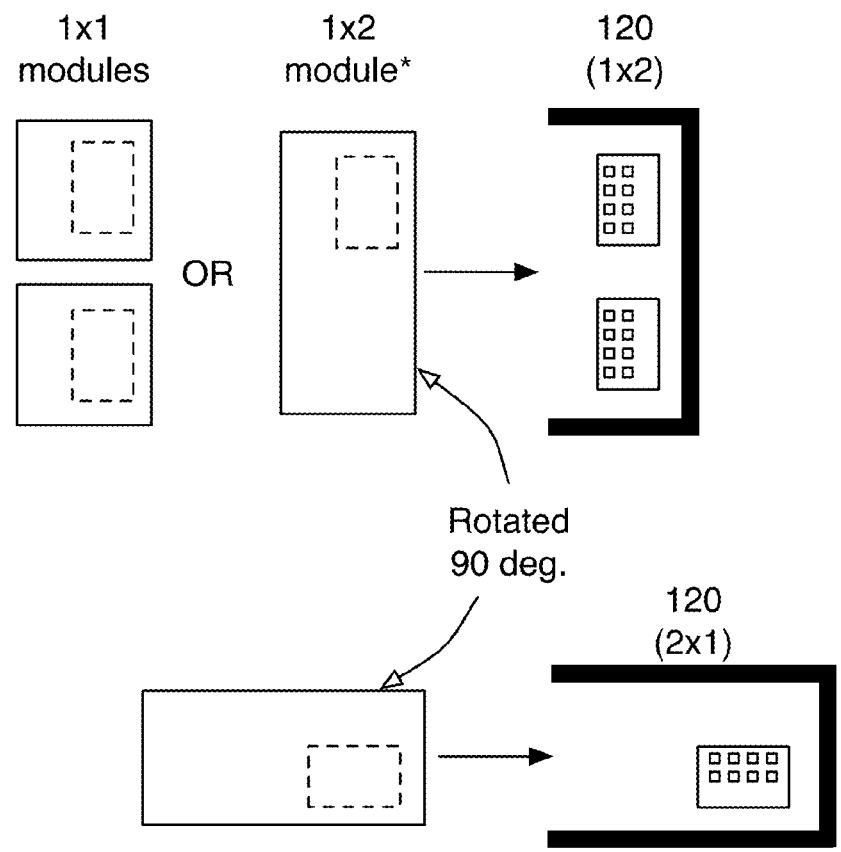
FIG. 14 is a diagram view of module couplers of a system of an invention embodiment.
Figure 14:
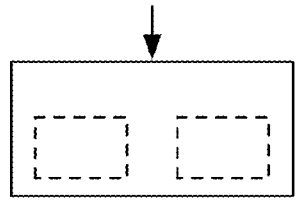
Figure 15:
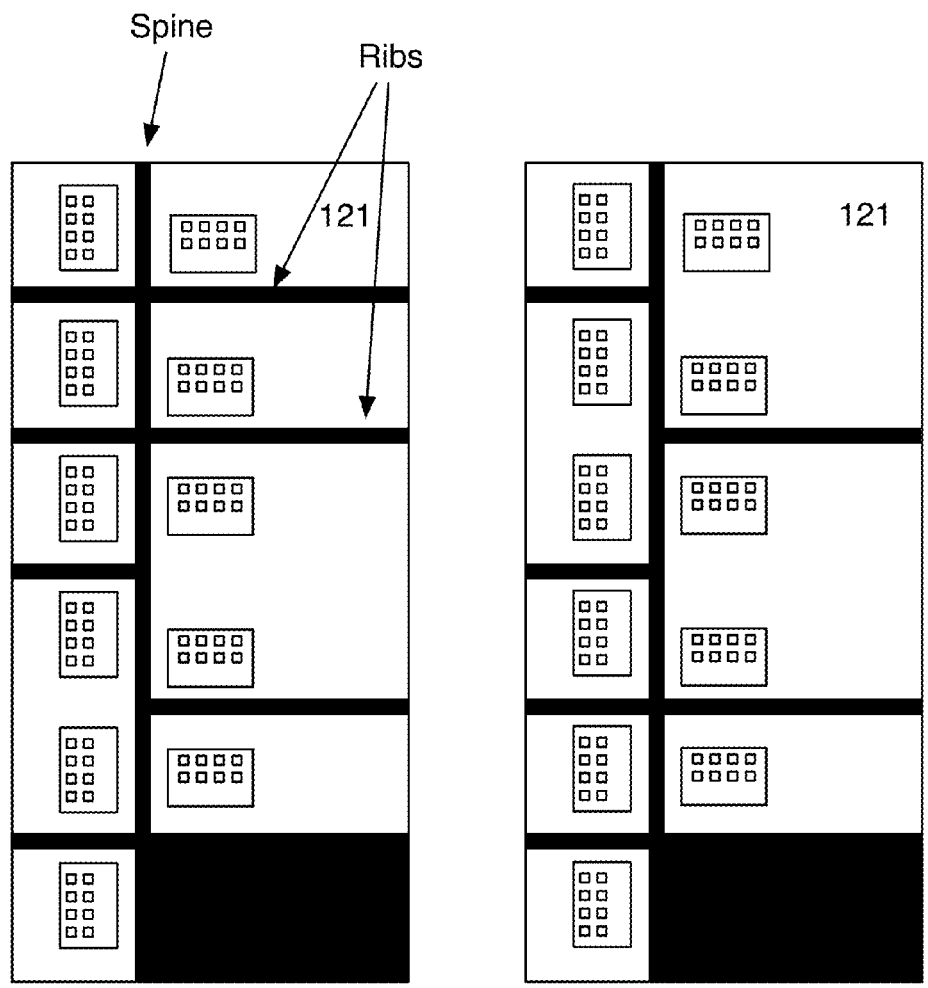
FIG. 15 is a diagram view of module coupler backplanes of a system of an invention embodiment.

As shown in FIG. 14, the module interfaces 113 of the MEDES 110 are preferably laid out in accordance with the grid system. Further, the module interfaces 113 are laid out in such a way to enable rotationally symmetric coupling for a particular grid layout, as previously mentioned. As shown in FIG. 15, the module interfaces 113 are also preferably laid out to allow different configurations of the module coupler backplane 121. This preferably includes placing more than one module interface 113 per module coupler 120 when the module coupler 120 is intended to couple with modules larger than unit size (i.e. 1×1). These configurations are preferably achieved by replacing the module coupler backplane 121. Additionally or alternatively, the module coupler backplane 121 may be physically reconfigurable (e.g., the spine/ribs/other module coupler 120 features may be moveable/removable/replaceable on the module coupler backplane).

The system 100 preferably includes a front module coupler backplane and a rear module coupler backplane. The rear module coupler backplane is preferably substantially similar to the module coupler backplane 121 of FIG. 1, and functions to couple most modules to the system 100. As shown in FIG. 16 (and FIG. 2), the front module coupler backplane is preferably designed to couple exceptionally large modules (particularly display modules) and other user input/output related modules to the system 100. For example, the front module coupler backplane might be designed to couple a keyboard module or other user-input module to the front of the system 100. The front module coupler backplane and the rear module coupler backplane preferably use different grid sizes, but alternatively may use the same grid sizes (or may organize module couplers 120 in any suitable arrangement). Further the front and rear module coupler backplanes preferably use different methods for securing modules to the module coupler backplanes, but may alternatively use the same methods for securing modules.

Figure 17:
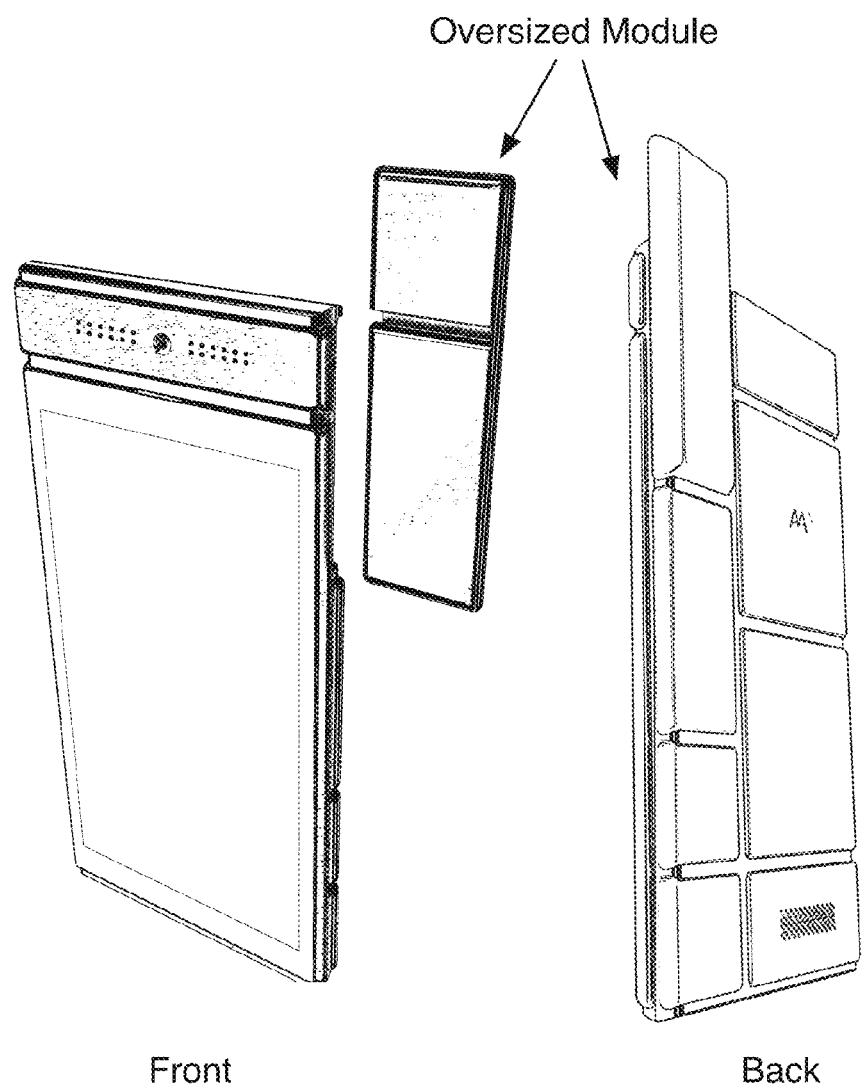
FIG. 17 is a model view of a system of an invention embodiment.

As shown in FIG. 17, the module coupler backplane 121 and/or chassis 130 preferably enables modules to extend beyond the dimensions of a module coupler 120 and the module coupler backplane 121 and/or chassis 130.

The chassis 130 functions to provide structural support to the system 100. As previously described, the chassis 130 may include, integrate, or be formed fully or partially from module coupler backplanes 121 or may be separate from any module coupler backplanes 121. The chassis 130 preferably at least partially encloses the MEDES 110, and more preferably encloses all of the MEDES 110 except for the module interfaces 113, but may additionally or alternatively couple to the MEDES 110 in any suitable manner. The MEDES 110 is preferably fixed to the chassis 130, but may alternatively be removable from the chassis 130. If the MEDES 110 includes a MEDES battery 114, the MEDES battery 114 is preferably removably fixed to the chassis 130 and electrically coupled to the MEDES 110, enabling the battery to be changed, but the MEDES battery 114 may additionally or alternatively be coupled to the chassis 130 and MEDES 110 in any suitable way. The chassis 130 is preferably of a rigid material to enable structural stability of the system 100, but may additionally or alternatively have any material composition. In a variation of an invention embodiment, the chassis 130 is preferably formed of a flexible material (e.g., the chassis 130 is a wrist band that accepts three modules around the band, such that the modular mobile electronic device formed with the chassis is similar in appearance to a smart watch).

Figure 18:
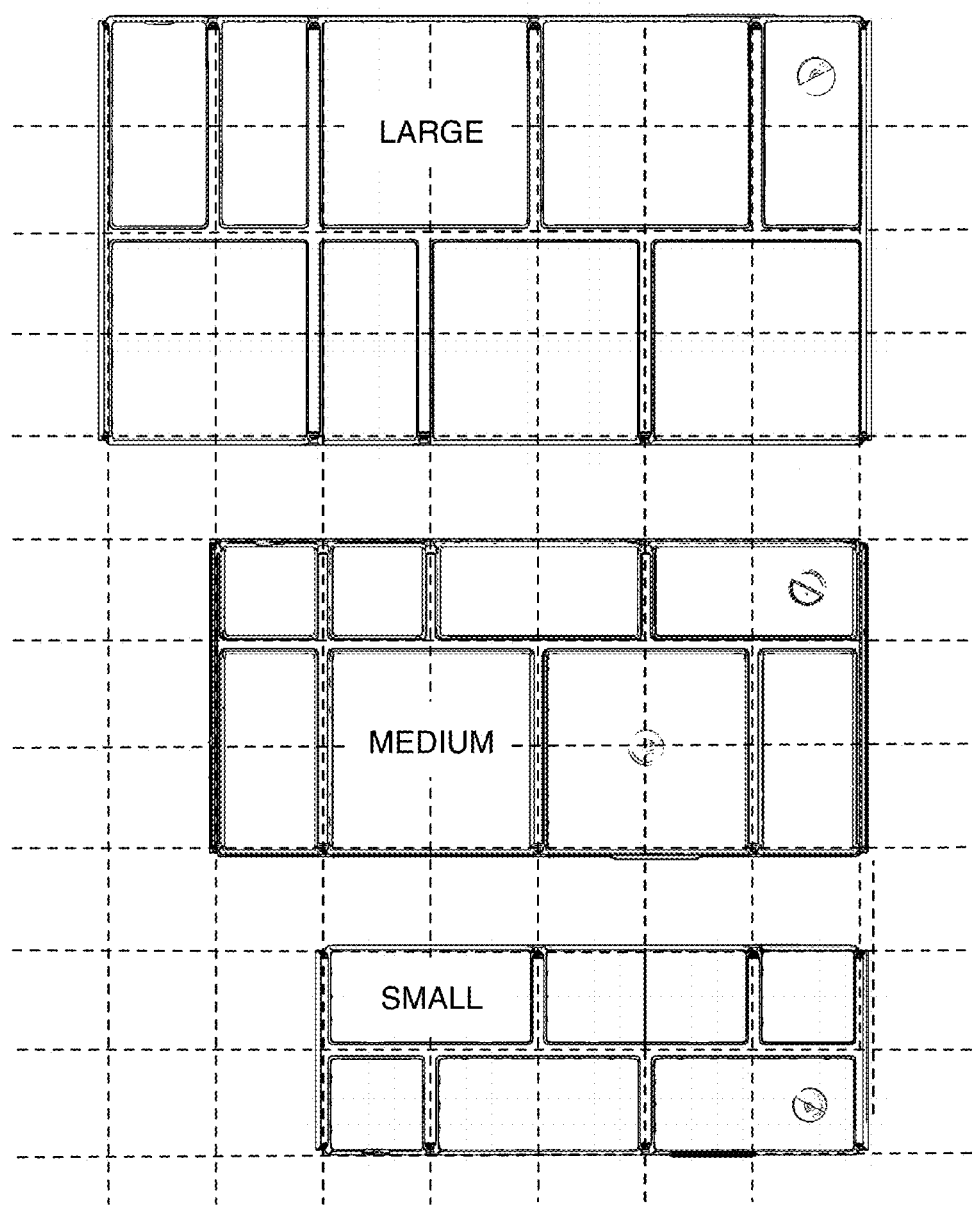
FIG. 18 is a diagram view of chassis of a system of an invention embodiment.

As shown in FIG. 18, chassis 130 (and/or module coupler backplanes 121) may be fabricated in multiple sizes for a given module grid size system, enabling modules of that grid size to be used flexibly across systems 100.

Figure 19:
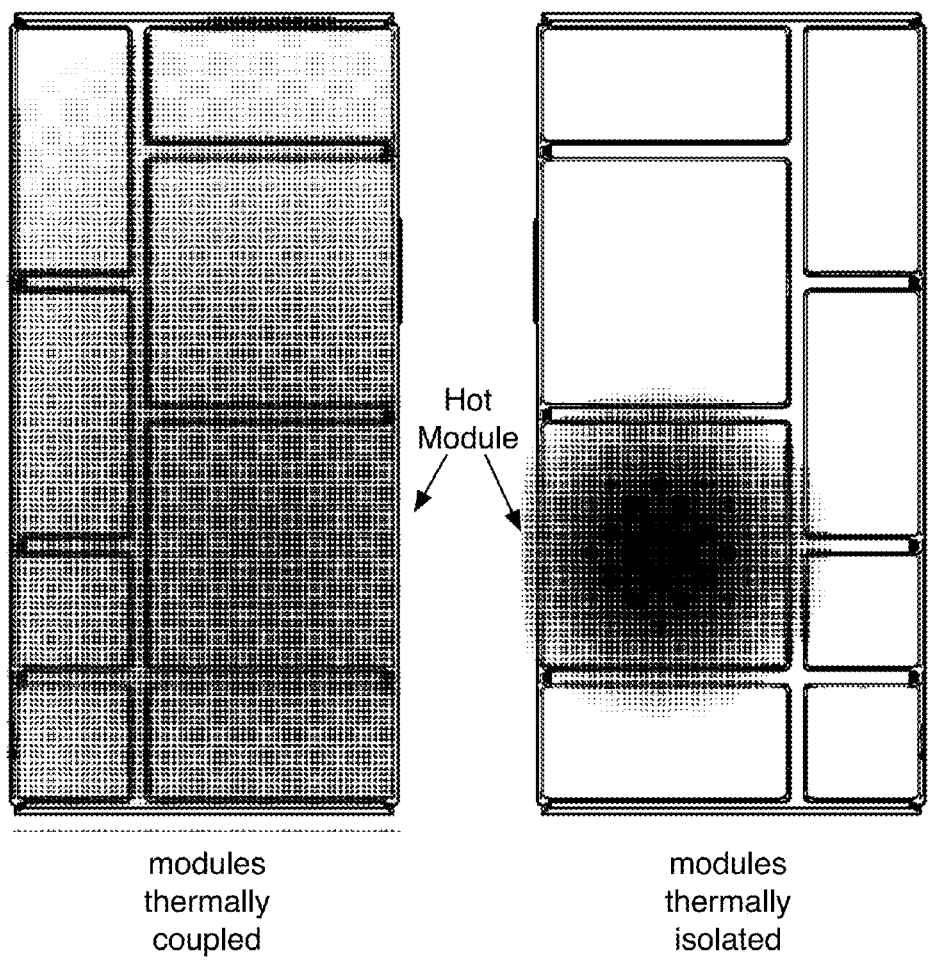
FIG. 19 is a thermal view of a system of an invention embodiment.

As shown in FIG. 19, the chassis 130 preferably also functions to thermally couple modules to each other. The chassis 130 preferably thermally couples to modules through the module couplers 120. The chassis 130 is preferably fabricated at least partially of a thermally conductive material (e.g. metal), enabling heat produced by modules to diffuse across the chassis. Allowing heat transfer preferably reduces heat concentration in modules coupled to the system 100, which can prevent damage to the system 100 or connected modules. The chassis 130 preferably enables thermal coupling of the modules through conductive heat transfer through the solid bulk of the chassis 130, but may additionally or alternatively enable thermal coupling through any other heat transfer means.

The chassis 130 may include structural features to assist heat transfer; for example, the chassis 130 may include passive heat transfer features; for example, passive heat exchangers designed to dissipate module heat to the air. As another example, the chassis 130 may contain fluid-filled channels, allowing heat transfer through the fluid. As a third example, the chassis 130 may contain heat pipes, allowing heat transfer based on both thermal conduction and phase transition. If the chassis 130 includes heat pipes, the heat pipes may include variable conductance heat pipes and/or diode heat pipes, allowing for variable and/or directional heat transfer through the chassis 130.

Passive heat transfer features are preferably fixed to the chassis 130 (e.g., cooling fins on an edge of the chassis 130), but may additionally or alternatively be removably coupled to the chassis 130 (e.g., a clip on heat sink or heat exchange cover).

The chassis 130 may also incorporate an active heat transfer system (e.g. by liquid cooling, thermoelectric devices, active air cooling, etc.). This active heat transfer system is preferably connected to and controlled by the MEDES 110.

Figure 20:
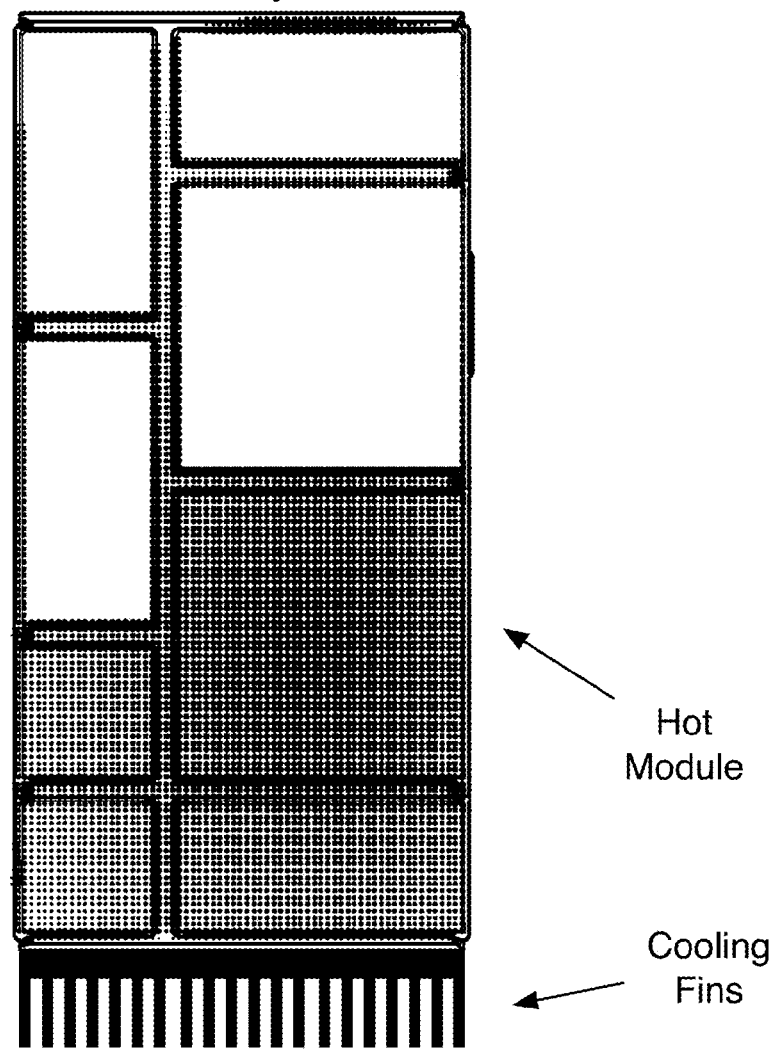
FIG. 20 is a model view of an integrated active heat transfer system of a system of an invention embodiment.

In one variation of an invention embodiment, the active heat transfer system preferably enables heat to be transferred preferentially from at least one location on the chassis 130 to at least one other location on the chassis 130. The active heat transfer system may additionally or alternatively function to selectively increase or decrease heat transfer between two locations on the chassis 130. The active heat routing system may be used, for instance, to allow a module especially sensitive to heat to be partially thermally isolated from modules that produce large amounts of heat. As shown in FIG. 20, the active heat routing system may additionally or alternatively be used to transfer heat from a module that produces large amounts of heat to a heat dissipation site on the chassis 110, allowing heat from that module to be dissipated without transferring substantially to surrounding modules. The active heat routing system is preferably controlled by the MEDES 110. The active heat routing system is preferably controlled by the MEDES 110 in response to temperature data from temperature sensors integrated in the chassis 130, but may additionally or alternatively be controlled in response to any suitable data. For example, the active heat routing system may be controlled based on temperature data from temperature sensors embedded in modules (data from which sensors may be transferred by the modules to the MEDES 110).

The chassis 130 may additionally or function to assist in managing the radio-frequency (RF) characteristics of the system 100. For instance, the chassis 130 might be designed to electromagnetically shield modules from one another. As another example, the chassis 130 may include an antenna used for wireless communication (e.g., by the MEDES 110 or by modules coupled to the system 100). The chassis 130 might also be designed to serve as an antenna at one or multiple frequencies for connected modules or the MEDES 110. The chassis 130 is preferably designed for either or both of these functions via the structure and materials of the chassis 130.

An antenna coupled to the chassis 130 may be connected to transceivers in a variety of ways. For example, the chassis 130 may include an antenna interface that connects to a corresponding interface on a module, allowing the antenna to connect to a transceiver through the module (potentially a transceiver in the module). As another example, an antenna may connect to conductive wires contained within the chassis 130 that allow for the antenna to be connected to a transceiver in a module and/or in the chassis 130. In this example, the antenna may connect directly to a transceiver or indirectly; e.g., through an antenna switch.

Figure 21:
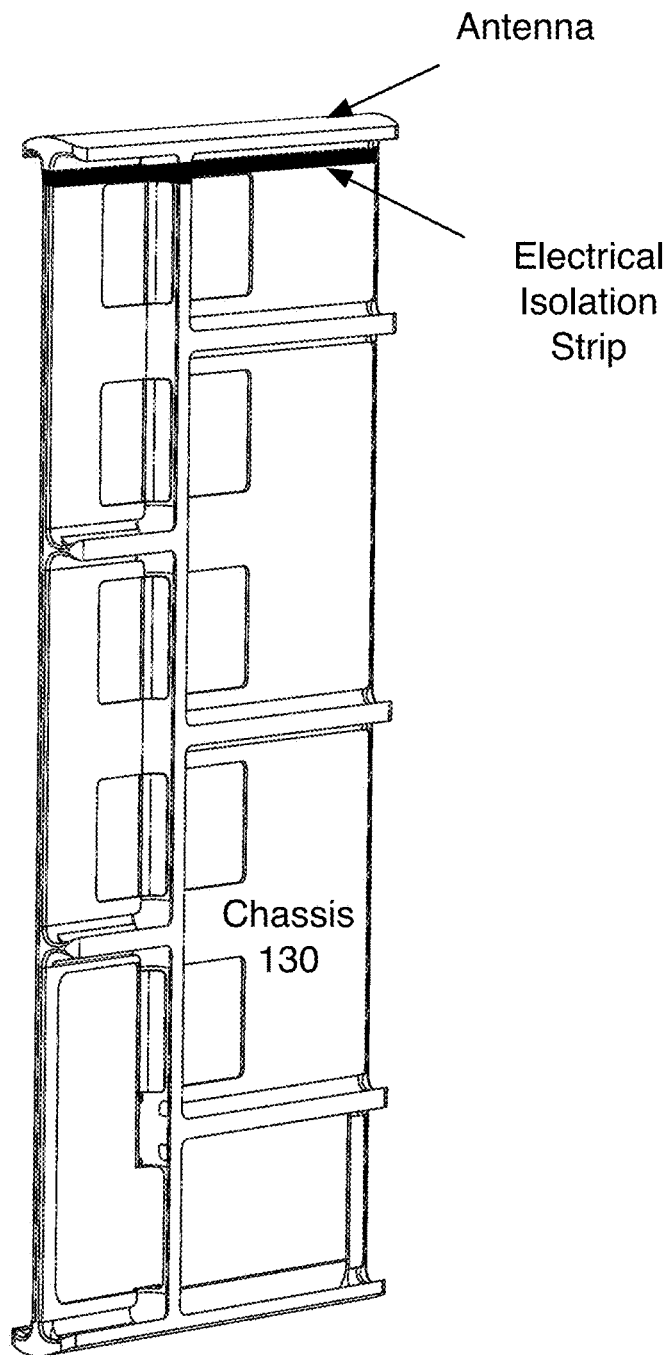
FIG. 21 is a perspective view of an antenna integrated into a chassis of a system of an invention embodiment.

If the chassis 130 or part of the chassis 130 serves as an antenna, the chassis 130 may be modified to enhance antenna performance. As shown in FIG. 21, in one example, an antenna is formed using one side of the chassis, which is electrically isolated from the rest of the chassis (which may serve as a ground, for instance).

The chassis 130 may additionally include sensors, actuators and/or other devices used to enhance functionality of the system 100. For instance, the chassis 130 may include self-diagnostic sensors (e.g. thermal sensors, electrical sensors, magnetic sensors). Self-diagnostic sensors preferably couple to the MEDES 110 and provide information about the state of the system 100 to the MEDES 110. One example of self-diagnostic sensors is a network of thermal sensors embedded in the chassis 130 that provide information on the temperature of the chassis 130 at various locations.

If the chassis 130 includes thermal sensors, the thermal sensors are preferably integrated into the chassis 130, but may additionally or alternatively be integrated into the MEDES 110, into the modules, and/or in any other suitable location. The thermal sensors preferably communicate temperature data to the MEDES 110, but may additionally or alternatively communicate temperature data to modules or any other suitable recipient. Temperature data may include temperature readings, data convertible to temperature readings (e.g. the voltage across a thermocouple), or any other suitable temperature data. The thermal sensors may be thermistors, resistance temperature detectors (RTDs), thermocouples, silicon bandgap temperature sensors, infrared sensors, or any other suitable thermal sensors. If the system 100 includes thermoelectric devices, those devices may additionally or alternatively be used to measure temperature differences across their junctions using the Seebeck effect.

In particular, the thermal sensors may include printed circuit board trace RTD sensors. PCB trace RTD sensors preferably measure temperature based on the changing resistance of a trace of a printed circuit board (PCB). This allows the thermal sensors to be integrated into other components. The PCB trace RTD sensors are preferably integrated into circuit boards of the MEDES 110, but may additionally or alternatively be integrated into any suitable circuit board, including circuit boards purpose built for thermal sensing.

The chassis 130 may also include sensors that are useful for a variety of mobile electronic devices (e.g. accelerometers, microphones, etc.) so that a module may not be needed for those sensors. The chassis 130 may also include actuators for similar reasons; for instance, a general purpose button that could be used as a power button, camera shutter button, etc. Other actuators might relate to the functions of the system 100; for instance, if modules are locked into module couplers 120 (e.g. by electrically controlled pins), the chassis 130 might integrate a module release button.

The chassis 130 may also include output devices to free up module space (e.g. a white LED that could be used as a flashlight/camera flash) or to relay system information (e.g. a red LED that could indicate if the MEDES 110 has power). As another example, the chassis 130 might include antennas that could connect to modules and/or the MEDES 110.

In a variation of an invention embodiment, the system 100 may not include a MEDES 110, with the functionality of the MEDES 110 instead being performed by modules coupled to the system 100. This might be the case for modules with self-contained power sources and wireless transceivers, where the communication network between said modules could be wholly enabled by hardware and software contained in the modules. In this case, the chassis 130 preferably provides structural support for the modules, and may additionally align the modules to assist in or enable wireless communication between them.

As a person skilled in the art will recognize from the previous detailed description and from the figures and claims, modifications and changes can be made to the invention embodiments of the invention without departing from the scope of this invention defined in the following claims.

We claim:

1. A system for enabling a chassis-coupled modular mobile electronic device comprising:
    a thermally conductive chassis, the chassis comprising a set of module couplers that removably and mechanically couple modules of the modular mobile electronic device to the chassis;
    a module communication network configured to enable data transfer between the modules through the module communication network when the modules are coupled to the chassis;
    a module power network configured to enable power transfer between the modules when the modules are coupled to the chassis; wherein the set of module couplers thermally couple modules of the modular mobile electronic device to the chassis;
    a plurality of thermal sensors coupled to the chassis; wherein at least one of the plurality of thermal sensors is located in a module coupler of the set of module couplers; and
    an active heat transfer system, wherein the active heat transfer system is controlled by the system in response to temperature data from the plurality of thermal sensors, wherein the active heat transfer system is configured to selectively increase heat transfer from a first module coupler of the set of module couplers to a second module coupler of the set of module couplers based on the temperature data that indicates that the first module coupler is at a higher temperature than the second module coupler.

2. The system of claim 1, wherein at least one of the plurality of thermal sensors is located in each module coupler of the set of module couplers.

3. The system of claim 1, wherein the plurality of thermal sensors comprises printed circuit board trace resistance temperature detectors.

4. The system of claim 1, wherein the plurality of thermal sensors comprises thermocouples.

5. The system of claim 1, further comprising cooling fins fixed to an edge of the chassis.

6. The system of claim 1, wherein the active heat transfer system comprises a thermoelectric device.

7. The system of claim 6, wherein the thermoelectric device is used to measure temperature using the Seebeck effect.

8. The system of claim 1, wherein the temperature data is transferred to the system over the module communication network.

9. The system of claim 1, wherein the heat transfer from the first module coupler of the set of module couplers to the second module coupler of the set of module couplers occurs via the thermally conductive chassis.

10. The system of claim 9, wherein the chassis comprises one or more variable conductance heat pipes that enable variable heat transfer, wherein the heat transfer from the first module coupler of the set of module couplers to the second module coupler of the set of module couplers occurs via at least one of the one or more variable conductance beat pipes.

11. The system of claim 9, wherein the chassis comprises one or more diode heat pipes that enable directional heat transfer, wherein the heat transfer from the first module coupler of the set of module couplers to the second module coupler of the set of module couplers occurs via at least one of the one or more diode heat pipes.

12. A system for enabling a chassis-coupled modular mobile electronic device comprising:
    a thermally conductive chassis, the chassis comprising a set of module couplers that removably and mechanically couple modules of the modular mobile electronic device to the chassis;
    a module communication network configured to enable data transfer between the modules through the module communication network when the modules are coupled to the chassis;

a module power network configured to enable power transfer between the modules when the modules are coupled to the chassis; wherein the set of module couplers thermally couple modules of the modular mobile electronic device to the chassis;

a plurality of thermal sensors coupled to the chassis; wherein at least one of the plurality of thermal sensors is located in a module coupler of the set of module couplers; and an active heat transfer system, wherein the active heat transfer system is controlled by the system in response to temperature data from the plurality of thermal sensors, wherein the active heat transfer system is configured to selectively increase heat transfer from a first module coupler of the set of module couplers to a second location on the chassis based on the temperature data that indicates a temperature associated with the first module coupler.

13. The system of claim 12, wherein the chassis comprises one or more variable conductance heat pipes that enable variable heat transfer or one or more diode heat pipes that enable directional heat transfer, wherein the heat transfer from the first module coupler of the set of module couplers to the second location on the chassis occurs via at least one of the one or more variable conductance heat pipes or the one or more diode heat pipes.

* * * * *